Sept. 27, 1966 E. WEISS ET AL 3,275,602
APPARATUS AND METHOD FOR THE SEMICONTINUOUS OR
CONTINUOUS POLYMERIZATION OF SOLID TRIOXANE
Filed July 11, 1961
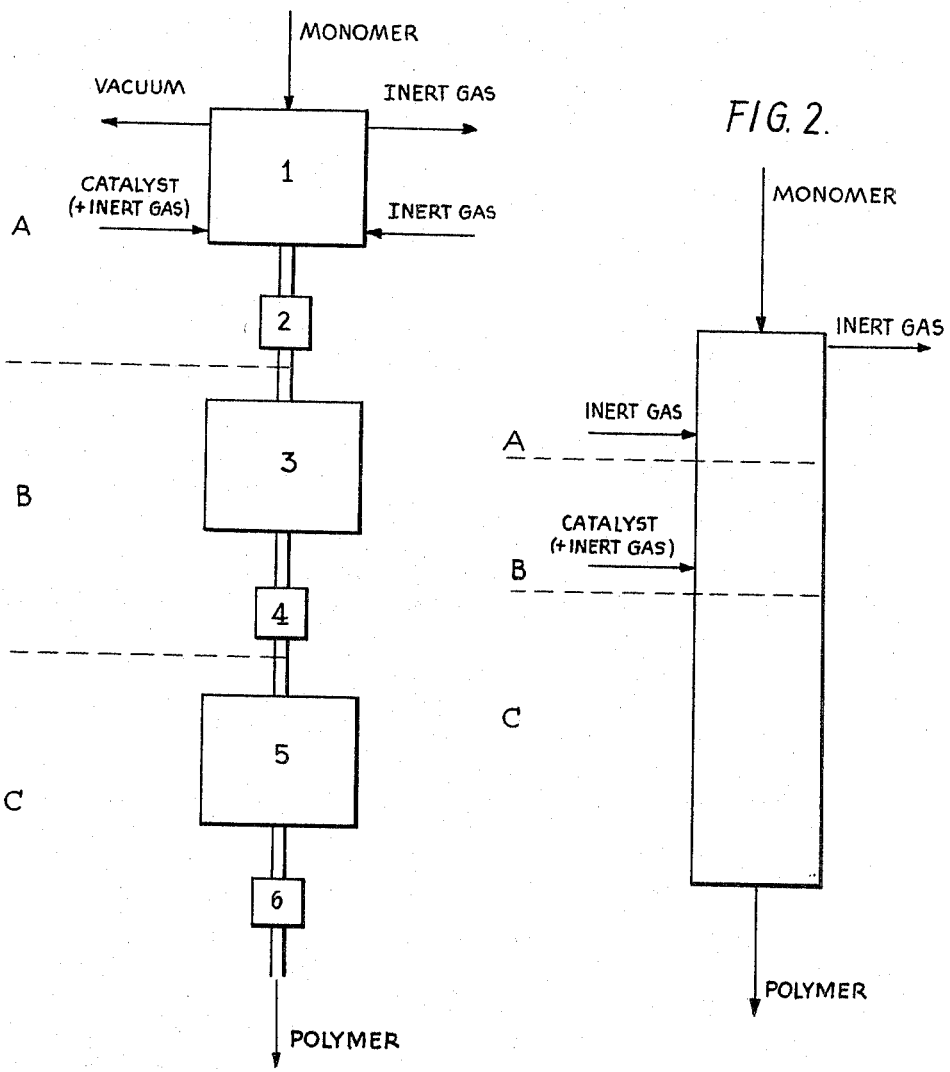
INVENTORS
EDUARD WEISS
EDGAR FISCHER
BY Curtis, Morris & Safford
ATTORNEYS United States Patent Office
3,275,602
Patented Sept. 27, 1966

3,275,602
APPARATUS AND METHOD FOR THE SEMICONTINUOUS OR CONTINUOUS POLYMERIZATION OF SOLID TRIOXANE
Eduard Weiss, Kelkheim, Taunus, and Edgar Fischer, Frankfurt am Main, Germany, assignors to Farbwerke Hoechst Aktiengesellschaft vormals Meister Lucius & Bruning, Frankfurt am Main, Germany
Filed July 11, 1961, Ser. No. 123,222
Claims priority, application Germany, July 16, 1960, F 31,676
9 Claims. (Cl. 260—67)

The present invention relates to an apparatus for use in the semicontinuous or continuous polymerization of solid trioxane and to methods for polymerizing solid trioxane.

French Patent 1,243,668 describes a process for making high molecular weight polyacetals, wherein low molecular weight cyclic acetals, advantageously trioxane, are polymerized in the presence of cationically active polymerization catalysts.

The present invention provides an apparatus for polymerizing solid trioxane in semicontinuous or continuous manner in the presence of ionic catalysts or activators, advantageously the cationic catalysts or activators specified in the above French Patent. By this reference, the above French Patent shall be considered part of the present specification. The apparatus involves optimum utilization of the trioxane and catalyst, respectively, high space-time yields, minimum energy expense, very good uniformity of the products obtained, and smooth reaction.

The apparatus of this invention is shown diagrammatically in the accompanying drawing in which the numerals designate the following parts:

1 is a charging vessel,
2 a charging or dosing means,
3 a reservoir,
4 a second charging or dosing means,
5 a polymerization vessel, and
6 a discharge means.

The charging vessel 1 is connected via the charging or dosing means 2 with the reservoir 3 and the reservoir 3 in turn is connected via the second charging or dosing means 4 with the polymerization vessel 5 which is provided with the discharge means 6.

The following operational steps are carried out in the apparatus:

A Purification and introduction of monomer
B Homogenization and formation of stock
C Reaction More especially, the apparatus is operated as follows: the solid trioxane to be polymerized is introduced in stage A into vessel 1. The apparatus is evacuated and/or scavenged with an inert gas, for example nitrogen or carbon dioxide, whereby the trioxane is freed from moisture and oxygen, and the catalyst or activator is added. The catalyst or activator may be introduced under reduced pressure or under an inert gas atmosphere, for example nitrogen or carbon dioxide, and may be used in gaseous form, for example gaseous boron trifluoride, or may be diluted with an inert gas, or may be used in solid form, for example in the form of diazonium salts of hydrofluoboric acid. The trioxane may be stirred, if desired, by means of a current of inert gas charged with the gaseous catalyst or activator. The trioxane may also be admixed with a desired proportion of crude polymer charged with the required catalyst. The proportion of crude polymer admixed with solid catalyst or activator added should be kept fairly small in order not to impair the capacity of the apparatus.

The trioxane may be mixed with the catalyst or activator or the crude polymer charged with activator or catalyst, for example under reduced pressure or superatmospheric pressure generated by superposition of one or more inert gases, and at different temperatures. It is, however, advantageous to work at atmospheric pressure or slightly superatmospheric pressure (for example 0.1 atm.) and at ambient temperature.

The trioxane charged with the catalyst or activator or mixed with catalyst or activator-charged crude polymer is conveyed via a charging or dosing means 2 into reservoir 3 (stage B). The charging or dosing means may be a normal shut off means in the case where the material is discharged discontinuously and merely under the influence of the force of gravity. For continuous discharge, it is preferred to use a dosing or conveying means, for example a bucket wheel or dosing screw.

The reservoir 3 ensures a uniform supply of material to the polymerization vessel 5 (stage C) even if fluctuations in charging vessel 1 occur. In reservoir 3 the catalyst is further homogenized and distributed on to the monomer by means of an appropriate mixing device, especially in those cases where several charges from vessel 1 are mixed with one another. When the amount and quality of the trioxane and the amount of catalyst or activator remain constant, vessel 1 may be omitted and the charging operation carried out continuously in reservoir 3 provided that the starting material has been purified in some other manner.

The charging means 4 is preferably a continuously operating dosing device, for example a screw or bucket wheel. The polymerization vessel used in reaction stage C may be a vertically arranged tube in which the reaction material travels from above to below under the influence of the force of gravity. The polymerization is initiated by heating the reactor 5 to an appropriate temperature in that zone where the trioxane charged with the catalyst or mixed with the catalyst-charged crude polymer enters into the reactor. The reactor may be equipped with a jacket heating or inner heating system, such as heating bars or coils. The heat required may be generated by means of steam, liquids or electrical current. The polymerization heat set free is dissipated in the zone following the inlet zone by indirect cooling. In order to obtain high conversion rates, it is advantageous to series-connect this cooled zone with a post-reaction zone which may be equipped with a heating means.

Agitation of the product can be intensified by using appropriate stirring or conveying means. The most different types of stirrer can be used for that purpose. The heating and/or cooling surfaces required may be inserted into the stirring means so as to enlarge the stationary heating and/or cooling surfaces and to increase their capacity.

Reactor 5 which is provided with a suitable stirring or conveying means may also be disposed in horizontal manner.

The reaction vessel may also be designed as a tube inclined in an angle between 0 and 90° in which the material is conveyed by the force of gravity and/or an appropriate stirring or conveying means. The reaction vessel may, for example, be designed as a trough with or without jacket heating or cooling means and with a hollow screw as conveying and heating or cooling means, the trough being so arranged that it can be inclined as desired.

In another embodiment of the invention, the polymerization vessel 5 is designed as a rotating plate, preferably disposed in horizontal manner, of which the number of revolutions can readily be adapted to the polymerization time. The heating and cooling means are preferably disposed in individual zones at the lower side of the plate.

The reactor 5 may also be designed as an endless belt or a means resembling a conveying belt, which is advantageously disposed in horizontal manner, whose length and speed can readily be adapted to the polymerization time and which can be equipped in known manner with cooling and heating means.

The discharging means 6 is advantageously designed as a continuously operating dosing means, for example a screw or bucket wheel.

As shown in FIG. 2 of the accompanying drawing, stages A, B and C may be combined in one reaction space, for example a vertically arranged tube or tower. In this embodiment, the monomer is continuously introduced from above, scavenged in counter-current manner, while stirring, with an inert gas, for example nitrogen or carbon dioxide, the gaseous catalyst, for example diluted with an inert gas is introduced at a position below that scavenging zone and uniformly distributed on to the monomer with the use of an appropriate stirring means. The monomer so charged with the catalyst travels through the heated activating zone, the following cooled reaction zone and the post-reaction zone which may be heated.

What is claimed is:

1. An apparatus for the polymerization of solid trioxane in the presence of a solid ionic catalyst which comprises a first sealed vessel having first inlet means for the introduction of solid monomeric trioxane, second inlet means for the introduction of said catalyst, third inlet means for the introduction of inert gas and outlet means for its removal, and means for evacuating said first vessel; a second sealed vessel in communication with said first vessel; first valve means between said first and second vessels for controlling a measured flow of solids from said first vessel to said second vessel; a polymerization reactor in communication with said second vessel and having heating and cooling means and discharge means; and second valve means between said second vessel and said polymerization reactor for controlling a measured flow of solids from said second vessel to said reactor.

2. An apparatus as in claim 1 wherein said reactor is a vertical tube.

3. An apparatus as in claim 1 wherein said reactor is a horizontal tube having conveying means therein.

4. An apparatus as in claim 1 wherein said reactor is a tube inclined at an angle of 0° to 90°.

5. An apparatus as in claim 1 wherein said reactor is a horizontal plate rotating about its vertical axis.

6. An apparatus as in claim 1 wherein said reactor is an endless belt.

7. A continuous method for polymerizing solid trioxane in the presence of a solid ionic polymerization catalyst therefor which comprises removing moisture and oxygen from said solid trioxane in an inert atmosphere, continuously admixing the now-purified solid trioxane with said solid ionic catalyst, initiating polymerization of the mixture of solid trioxane and solid catalyst by passing a continuous stream of said mixture through a heating zone, and then removing the heat of polymerization from the resulting polymer by passing said continuous stream through a cooling zone.

8. A method as in claim 7 wherein said catalyst is a diazonium salt of hydrofluoboric acid.

9. A method as in claim 8 wherein said stream comprises a rotatably supported mixture of solid trioxane and diazonium salt catalyst.

References Cited by the Examiner

UNITED STATES PATENTS

| | | | |
|---|---|---|---|
| 1,364,803 | 1/1921 | Rankin | 23—290 |
| 2,461,104 | 2/1949 | Bates | 23—288.3 |
| 2,673,832 | 3/1954 | Lassiat | 23—289 |
| 2,863,737 | 12/1958 | Green | 23—290 |
| 2,871,106 | 1/1959 | Crowley et al. | 23—290 |
| 2,955,926 | 10/1960 | Illich et al. | 23—289 |
| 2,989,508 | 6/1961 | Hudgin et al. | 260—67 |
| 3,001,235 | 9/1961 | Komiyama et al. | 260—67 |
| 3,012,024 | 12/1961 | Kavesh | 23—289 |
| 3,093,626 | 6/1963 | Cines | 23—289 |
| 3,118,859 | 1/1964 | Delassus et al. | 260—67 |

FOREIGN PATENTS 1,243,668  9/1960  France.

WILLIAM H. SHORT, *Primary Examiner.*

HAROLD BURSTEIN, *Examiner.*

L. M. MILLER, *Assistant Examiner.*